(No Model.)
W. S. SEYMOUR.
NON-CONDUCTING COVERING FOR STEAM PIPE FITTINGS.
No. 313,958. Patented Mar. 17, 1885.
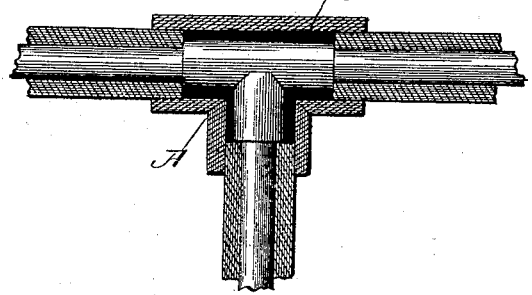
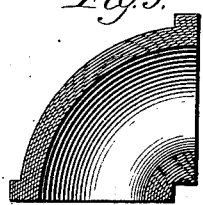
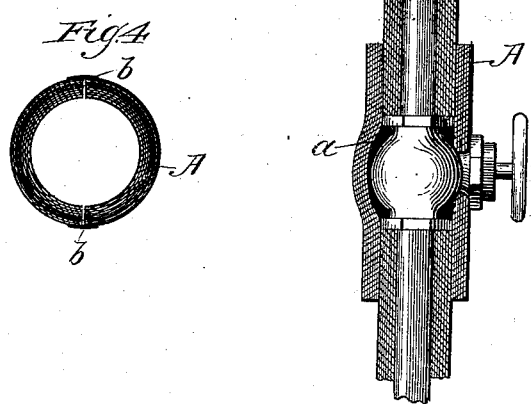
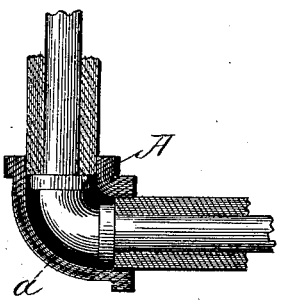
Witnesses.
Will R. Onohundro.
W. Rossiter.
Inventor
William S. Seymour
By, Jno. G. Elliott
Atty.
N. PETERS, Photo-Lithographer, Washington, D.C.

United States Patent Office.

WILLIAM S. SEYMOUR, OF CHICAGO, ILLINOIS, ASSIGNOR TO JAMES H. SHIELDS AND FREDERICK E. BROWN, BOTH OF SAME PLACE.

NON-CONDUCTING COVERING FOR STEAM-PIPE FITTINGS.

SPECIFICATION forming part of Letters Patent No. 313,958, dated March 17, 1885.

Application filed February 18, 1884. (No model.)

*To all whom it may concern:*

Be it known that I, WILLIAM S. SEYMOUR, a citizen of the United States, residing at Chicago, county of Cook, and State of Illinois, have invented certain new and useful Improvements in Non-Conducting Coverings for Steam-Pipe Fittings, of which the following is a specification.

This invention relates to improvements in non-conducting coverings for elbows, T-joints, valves, and other fittings for steam-pipes, which coverings are designed to be used in connection with any suitable coverings for the steam-pipes themselves, to prevent the radiation of heat, or in other cases in which it is intended to protect the pipes from intense cold—as, for instance, water-pipes.

The objects of this invention are to provide for keeping in stock coverings conforming to the various fittings, and constructed in such a manner that they may be conveniently attached to or removed from said fittings.

Heretofore the coverings employed for fittings have not conformed thereto, and have been constructed of pipe-coverings by mitering them, and could only be adjusted to their operative position by first slipping them on the pipe before connecting it with its fittings, which not only requires unnecessary time, but presents an unsightly appearance.

In the accompanying drawings, Figure 1 represents a longitudinal section of a T-fitting covering embodying my invention; Fig. 2, a similar view of a globe-valve covering; Fig. 3, a similar view of an elbow-covering; Fig. 4, a transverse section of one of my coverings for fittings; Fig. 5, a side elevation of one piece of my two-part coupling.

Similar letters of reference indicate the same parts in the several figures of the drawings.

The several and varied forms of coverings A for fittings shown in the drawings may be composed of layers of paper, felt, or asbestus, or of portions of each, compressed to the form of the particular fitting for which the covering is intended, and these several sheets may be joined together by pasting, stitching, or in any other convenient and desirable manner; or these fitting-coverings may be composed of a pulp of any of these or any other material suitable for non-conducting purposes by molding them into the desired or required forms and their varying sizes. In any case, however, the inner and outer surfaces of the fitting-covering should substantially conform to the shape of the particular fitting for which it is designed, though its inner diameter may, if preferred, be greater than the diameter of the fitting, so as to leave dead-air spaces $a$, which will materially promote non-conduction. In this connection it should be stated that these coverings may be composed in part or in whole of corrugated or indented sheets for providing cellular dead-air spaces throughout said covering.

It is obvious that in a whole condition much time, labor, and inconvenience would be required in attaching any of these coverings for fittings, and in some cases—as, for instance, the valve-covering—wholly impracticable. Besides, these coverings are usually applied to fittings after they are united to the pipe, in which case the coverings could not be applied without first detaching the pipes. To avoid these objections it is necessary that some division of the covering should be made, and such vision of the covering should be made, and such a division as will not involve a multiplicity of pieces, or more than ordinary skill to join them in their operative position, so as to form substantially a contiguous covering. In attaining this end I halve the covering—that is to say, divide it on a longitudinal line, as illustrated in Figs. 4 and 5—and join these halves or two parts after they are in their operative position by ordinary staples, $b$, as indicated in Fig. 4, or by pasting strips of paper or fabric across the meeting edges of the covering, or both.

The invention herein involved is not limited to the particular form of fittings shown and described, but may be applied to any or all of the pipe-fittings in ordinary use, or of irregular shape.

In some instances it will obviously not be necessary to actually separate the fitting-coverings into two pieces, but merely slit them along one side or edge, so as to force them open and spring them upon the fittings, as is sometimes done with pipe-coverings.

Having described my invention, what I claim, and desire to secure by Letters Patent, is—

1. A covering for pipe-fittings composed of sheets or pulp, having its outer surface conforming substantially in shape to said fittings, and split or divided longitudinally, substantially as described.

2. The combination, with a pipe-fitting covering composed of non-conducting sheets or pulp having its outer surface conforming substantially in shape to said fittings, and split or divided longitudinally, of a fastening device or devices, substantially as described.

WILLIAM S. SEYMOUR.

Witnesses:
JNO. G. ELLIOTT,
W. W. ELLIOTT.